(12) United States Patent
Mizutani

(10) Patent No.: US 11,398,252 B2
(45) Date of Patent: Jul. 26, 2022

(54) AUDIO PROCESSING APPARATUS AND METHOD OF CONTROLLING AUDIO PROCESSING APPARATUS

(71) Applicant: CANON KABUSHIKI KAISHA, Tokyo (JP)

(72) Inventor: Hitoshi Mizutani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/175,478

(22) Filed: Feb. 12, 2021

(65) Prior Publication Data

US 2021/0264948 A1 Aug. 26, 2021

(30) Foreign Application Priority Data

Feb. 21, 2020 (JP) .............................. JP2020-028053

(51) Int. Cl.
| | |
|---|---|
| *G11B 27/00* | (2006.01) |
| *G06F 16/783* | (2019.01) |
| *G11B 27/36* | (2006.01) |
| *G11B 27/034* | (2006.01) |
| *G11B 27/32* | (2006.01) |

(52) U.S. Cl.
CPC ........ *G11B 27/005* (2013.01); *G06F 16/7834* (2019.01); *G11B 27/034* (2013.01); *G11B 27/329* (2013.01); *G11B 27/36* (2013.01)

(58) Field of Classification Search
CPC ..... G11B 27/005; G11B 27/36; G11B 27/034; G11B 27/329; G06F 16/7834
See application file for complete search history.

(56) References Cited

U.S. PATENT DOCUMENTS

| | | | |
|---|---|---|---|
| 2011/0199496 A1* | 8/2011 | Muraki | H04N 5/772 348/218.1 |
| 2012/0057843 A1* | 3/2012 | Otani | G11B 27/105 386/224 |
| 2020/0382741 A1* | 12/2020 | Chen | H04N 21/4147 |

FOREIGN PATENT DOCUMENTS

JP 2005301641 A 10/2005

* cited by examiner

*Primary Examiner* — Girumsew Wendmagegn
(74) *Attorney, Agent, or Firm* — Canon U.S.A., Inc. IP Division

(57) ABSTRACT

An audio processing apparatus includes an audio file recovery unit configured to recover an audio file related to a video file. With video data of the video file and audio data of the audio file recorded at different speed rates from each other, the audio file recovery unit recovers the audio file so that an end position of the audio data coincides with an end position of the video data in playback of the audio data and the video data at a speed rate.

9 Claims, 4 Drawing Sheets

AUDIO PROCESSING APPARATUS AND METHOD OF CONTROLLING AUDIO PROCESSING APPARATUS

BACKGROUND

Field of the Disclosure

The present disclosure relates to audio processing apparatuses.

Description of the Related Art

Some camcorders have specifications providing the slow and fast function of capturing video data (e.g., MP4) at a recording frame rate different from a playback frame rate, achieving a slow or fast motion effect. Specifically, overcranking a camcorder to shoot video at a recording frame rate exceeding a playback frame rate produces a slow motion effect. Conversely, undercranking the camcorder to shoot at a recording frame rate less than a playback frame rate produces a fast motion effect.

In addition, some slow and fast functions are designed with specifications to record video and separately audio at the same speed and synchronize the audio with the video in editing. It is particularly important to synchronize audio and video in which starting points of video capturing are determined based on a clapperboard. The adjustment between the playback time scale of the audio and that of the video in editing enables the synchronization of the audio and the video as illustrated in FIG. 4A to lip-synchronize them.

If the recording medium as a recording destination is removed during audio recording, the recording is instantaneously interrupted, a corrupted audio file being generated. As for a corrupted audio file, Japanese Patent Application Laid-Open No. 2005-301641 discusses an audio file recovery method of recovering a corrupted audio file. The recovery method analyzes the audio file and updates metadata based on a detected valid data length (the length of recording completed audio data) to recover the audio file.

If audio recording is instantaneously interrupted as described above, the audio data becomes insufficient relative to the video data. Consequently, the adjustment of the playback time scale in editing so that the playback start and end positions of audio data of a recovered audio file may coincide with those of the video data of the video file results in producing an unsynchronous video and audio, unlike that illustrated in FIG. 4B, failing in lip synchronization. Thus, the audio out of synchronization with the video prevents the starting point of video capturing from being determined based on a clapperboard.

SUMMARY

The present disclosure has been made in view of such a condition and is directed to providing an audio processing apparatus that recovers an audio file in lip synchronization, even in adjustment of the playback time scale of recovered audio data to the corresponding video data with a speed rate different from that of audio data of the audio file.

According to an aspect of the present disclosure, an audio processing apparatus includes an audio file recovery unit configured to recover an audio file related to a video file. With video data of the video file and audio data of the audio file recorded at different speed rates from each other, the audio file recovery unit recovers the audio file so that an end position of the audio data coincides with an end position of the video data in playback of the audio data and the video data at a speed rate.

Further features of the present disclosure will become apparent from the following description of exemplary embodiments with reference to the attached drawings.

DESCRIPTION OF THE EMBODIMENTS

Figure 1:
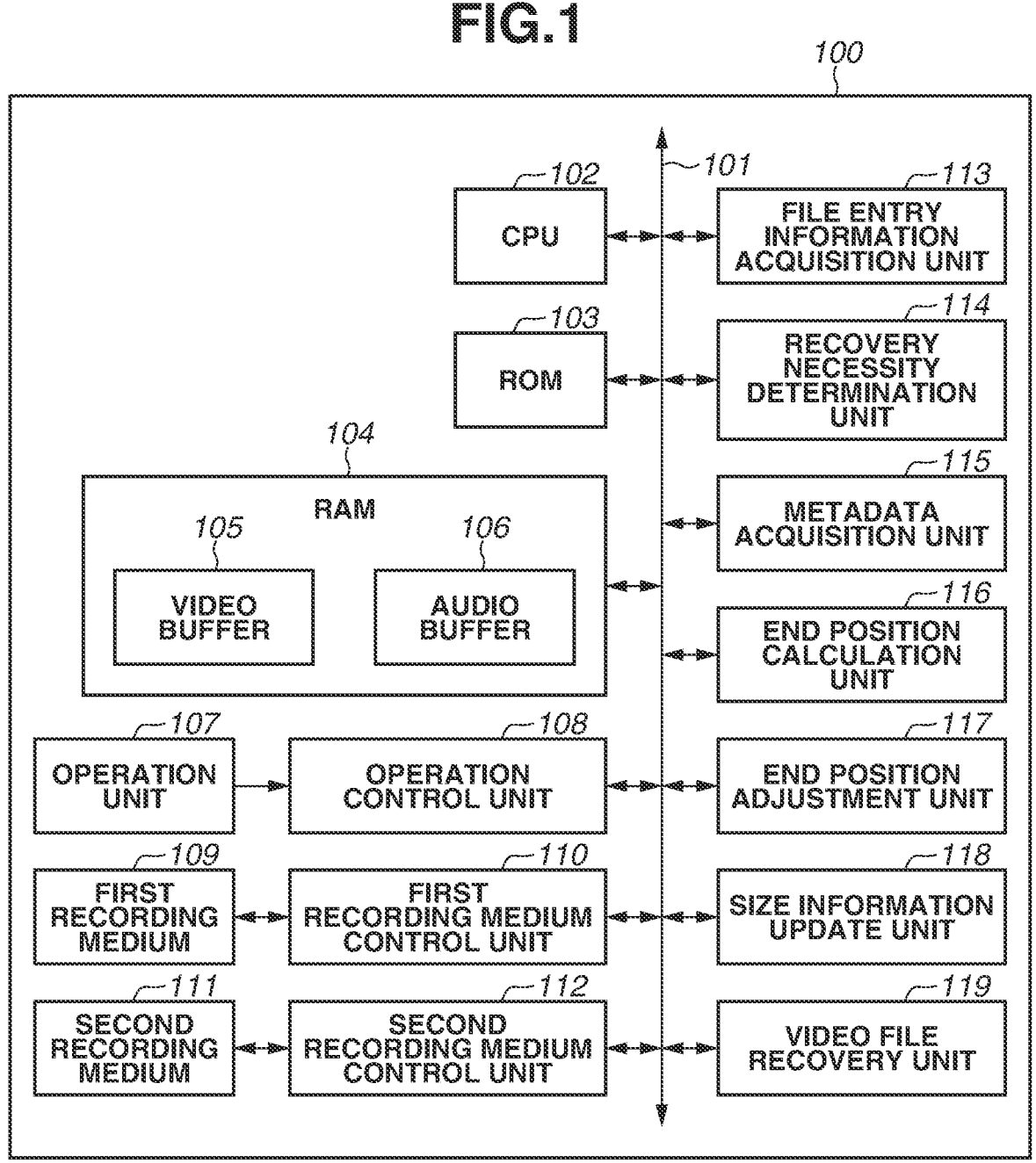
FIG. 1 is a block diagram illustrating the configuration of an audio processing apparatus.

FIG. 1 is a block diagram illustrating an example of the internal configuration of an audio processing apparatus 100 according to the present exemplary embodiment. As illustrated in FIG. 1, the audio processing apparatus 100 includes a bus 101, a central processing unit (CPU) 102, a read only memory (ROM) 103, a random access memory (RAM) 104, a video buffer 105, an audio buffer 106, an operation unit 107, an operation control unit 108, a first recording medium 109, a first recording medium control unit 110, a second recording medium 111, a second recording medium control unit 112, a file entry information acquisition unit 113, a recovery necessity determination unit 114, a metadata acquisition unit 115, an end position calculation unit 116, an end position adjustment unit 117, a size information update unit 118, and a video file recovery unit 119.

The CPU 102 includes one or more processors. The CPU 102 runs a program stored in the ROM 103 while referring to various kinds of information stored in the RAM 104 to control units in the audio processing apparatus 100. The various kinds of information stored in the RAM 104 include variable information, stack information for function call, and heap information for dynamic memory allocation.

The bus 101 consists of an address bus, a data bus, and a control bus. Through the bus 101, instructions and data are communicated between units in the audio processing apparatus 100.

The first recording medium 109 and the second recording medium 111 are detachable from the audio processing apparatus 100, and respectively store video files and audio files that are recorded using a slow and fast function. The slow and fast function, as mentioned above, is a function of recording audio data at 1.0 times speed and video data at a speed rate other than 1.0 times speed. As a result, the audio data in an audio file and the video data in a video file are recorded at different speed rates. In the present exemplary embodiment, the video file and the audio file corresponding to the video file are recorded in different recording media. In the present exemplary embodiment, the video file is recorded in the first recording medium 109, and the audio file is recorded in the second recording medium 111. However, the video file may be recorded in the second recording medium 111, and the audio file be recorded in the first recording medium 109. Alternatively, the video file and the audio file may be recorded in a recording medium.

The operation unit 107 includes a physical key for starting recovery of a corrupted audio file. The operation unit 107 may include a touch panel soft key instead of a physical key.

Upon the operation of the operation unit 107 by a user, the operation control unit 108 notifies the CPU 102 of the detected operation information. After the operation control unit 108 detects the operation performed by the user and notifies the CPU 102 of the detected information, the CPU 102 executes processing corresponding to the operation information. For example, upon the receipt of operation information about recovery start by the CPU 102, the CPU 102 issues a recovery preparation instruction to the file entry information acquisition unit 113.

Upon the receipt of the recovery preparation instruction from the CPU 102 by the file entry information acquisition unit 113, the file entry information acquisition unit 113 issues an acquisition instruction to the first recording medium control unit 110 and the second recording medium control unit 112 to respectively acquire first file entry information and second file entry information. The first file entry information contains the file name (including the extension) of the video file. The second file entry information contains the file name (including the extension) and the file size of the audio file. Then, the file entry information acquisition unit 113 notifies the recovery necessity determination unit 114 and the end position calculation unit 116 of the acquired file entry information.

The first recording medium control unit 110 and the second recording medium control unit 112 execute acquisition of file entry information, change of extensions, padding, and truncation on the video file and the audio file based on the notified instructions. Then, the first recording medium control unit 110 and the second recording medium control unit 112 notify the instruction source of the completion of the processing.

Upon the receipt of the file entry information from the file entry information acquisition unit 113 by the recovery necessity determination unit 114, the recovery necessity determination unit 114 determines that the video file and the audio file are recovery targets if the extension of the video file and the extension of the audio file are DMV and DAT, respectively. Subsequently, the recovery necessity determination unit 114 searches for a video file and an audio file under the same file name except for their extensions are present. If present, the recovery necessity determination unit 114 determines that both the video file and the audio file are recorded simultaneously using a slow and fast function. Next, if the video file is a recovery target, the recovery necessity determination unit 114 issues a video file recovery start instruction to the video file recovery unit 119. Otherwise, the recovery necessity determination unit 114 issues an audio file recovery start instruction to the metadata acquisition unit 115, and simultaneously notifies the metadata acquisition unit 115 of the corrupted audio file name and the video file name associated with the corrupted audio file name.

Upon the receipt of the recovery start instruction from the recovery necessity determination unit 114 by the video file recovery unit 119, the video file recovery unit 119 analyzes the corrupted video file and issues a video data truncation instruction to the first recording medium control unit 110 based on the valid data length of the video data of the video file (the length of recording completed data). Next, the video file recovery unit 119 updates metadata based on the valid data length to recover the video file. Subsequently, the video file recovery unit 119 issues an audio file recovery start instruction to the metadata acquisition unit 115.

Upon the receipt of the recovery start instruction from the recovery necessity determination unit 114 or the video file recovery unit 119 by the metadata acquisition unit 115, the metadata acquisition unit 115 issues a video file readout instruction to the first recording medium control unit 110, and stores the video file readout instruction in the video buffer 105. Then, the metadata acquisition unit 115 analyzes the header portion of the video file to acquire the total number of frames, the recording frame rate, and the playback frame rate from the metadata, and notifies the end position calculation unit 116 of them. Moreover, the metadata acquisition unit 115 issues an audio file readout instruction to the second recording medium control unit 112, and stores the audio file readout instruction in the audio buffer 106. Then, the metadata acquisition unit 115 analyzes the header portion of the audio file to acquire the number of audio samples and the sample size from the metadata, and notifies the end position calculation unit 116 of them.

The end position calculation unit 116 uses the expression below to calculate a padding size to be added to the end of the audio file. This calculation is based on the total number of frames of the video file, the recording frame rate, the playback frame rate, and the file size information about the audio file notified by the file entry information acquisition unit 113 and the metadata acquisition unit 115. Upon the calculation of the padding size, the end position calculation unit 116 notifies the end position adjustment unit 117 of the padding size.

$$PaddingSize = SampleSize * SamplePerFrame * NumOfVideoFrames * \frac{PlaybackFrameRate}{RecordingFrameRate} - (FileSize - HeaderSize) \quad \text{Expression 1}$$

where PaddingSize is a padding size, SampleSize is a sample size, SamplePerFrame is the number of audio samples per video data frame, NumOfVideoFrames is the total number of frames of video data, PlaybackFrameRate is a playback frame rate of video data, RecordingFrameRate is a recording frame rate of video data, FileSize is the size of an audio file, and HeaderSize is the header size of an audio file. The number of audio samples per frame differs among playback frame rates. For example, if the playback frame rate is 59.94p, the number of audio samples per frame is 801, 800, 801, 801, and 801, which are repeated in this order. In Expression 1, (PlaybackFramRate/RecordingFrameRate) corresponds to a speed rate of video data. In addition, (sampleSize*SamplePerFrame*NumOfVideoFrames)* (PlaybackFrameRate/RecordingFrameRate) indicates the size of audio data corresponding to the total number of frames of video data where audio is played back at the same speed rate as the video data. Moreover, (FileSize−HeaderSize) indicates the size of audio data of the audio file.

Thus, PaddingSize calculated by Expression 1 is a data size to be added to the audio data of the audio file. The data size allows the audio data to have the end of its playback end in time with the end of the video data playback end, so that the audio data may be played back at a speed rate in time with recoding speed of the video data. For example, with video data recorded at 0.5 times speed and audio data recorded at 1.0 times speed, PaddingSize is a data size to be added to the audio data for the playback end position of the video data to coincide with that of the audio data, so that the audio data is played back at 0.5 times speed. Moreover, if video file information notified by the metadata acquisition unit 115 is an invalid value, the end position calculation unit 116 determines that no video file associated with the audio file (the recovery target) is present. If no video file associated with the audio file (the recovery target) is present, the end position calculation unit 116 calculates a truncation size in recovery processing for the size of the audio data of the audio file to equal the size of an audio sample multiplied by a multiple of the number of audio samples. Then, the end position calculation unit 116 notifies the end position adjustment unit 117 of the truncation size.

Upon the receipt of the padding size or the truncation size notified by the end position calculation unit 116 by the end position adjustment unit 117, the end position adjustment unit 117 issues a padding instruction or a truncation instruction to the second recording medium control unit 112. Then, the end position adjustment unit 117 notifies the size information update unit 118 of size information about the recovered audio file.

Upon the receipt of the recovered audio file size information notified by the end position adjustment unit 117 by the size information update unit 118, the size information update unit 118 updates size information included in the header portion of the audio file loaded into the audio buffer 106, and issues a writing instruction to the second recording medium control unit 112. Subsequently, the size information update unit 118 issues an extension change instruction to the second recording medium control unit 112. Then, the size information update unit 118 notifies the CPU 102 of the completion of the recovery.

Figure 2:
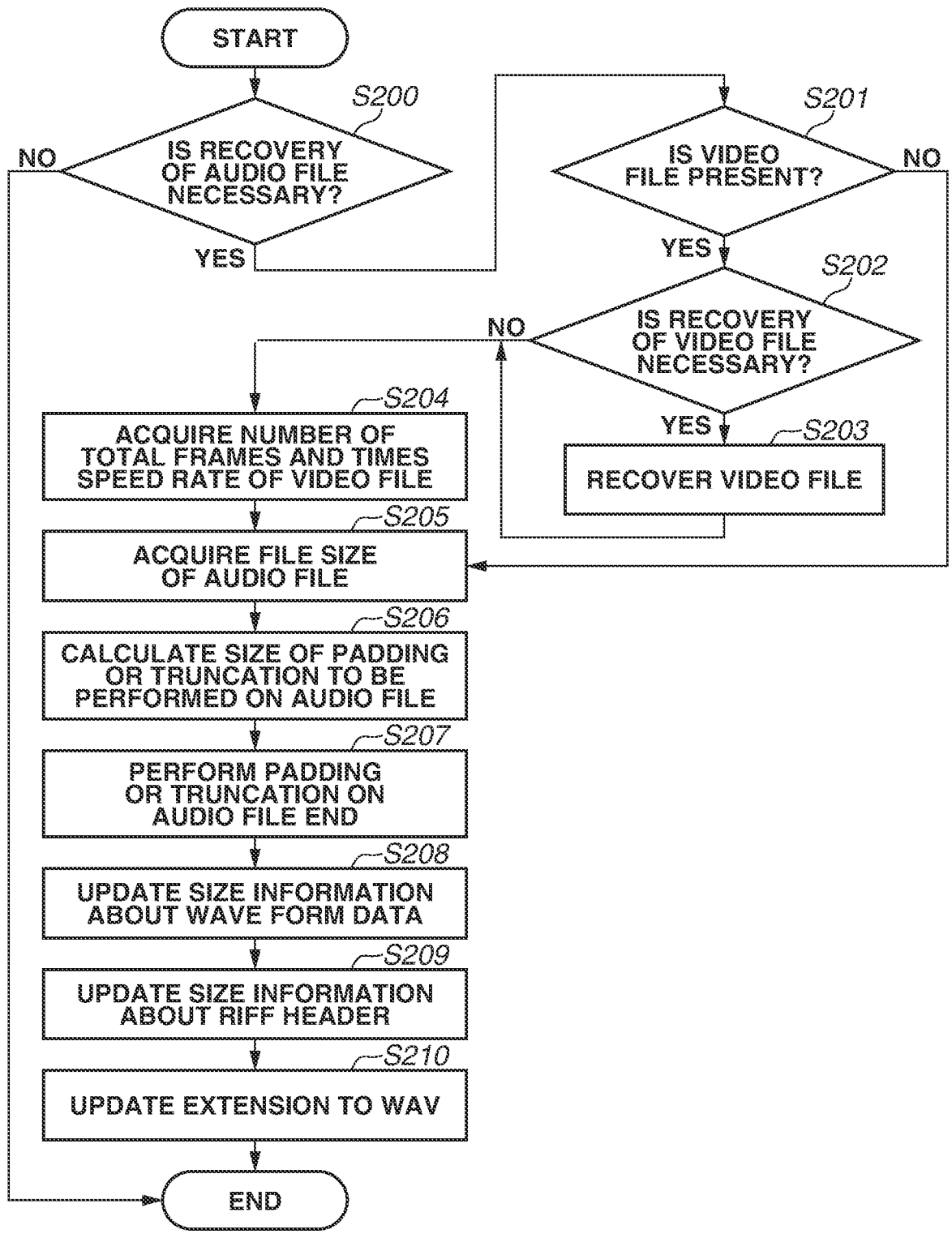
FIG. 2 is a flowchart illustrating audio file recovery processing performed by the audio processing apparatus.

Audio file recovery processing according to the present exemplary embodiment will be described with reference to a flowchart illustrated in FIG. 2. The processing illustrated in FIG. 2 is executed upon the receipt of operation information from the operation control unit 108 by the CPU 102. The operation information indicates that an instruction to start recovery processing on audio file selected by the user via the operation unit 107 has been issued. The CPU 102 controls each unit and performs various kinds of processing based on a program read out from the ROM 103 to execute the audio file recovery processing illustrated in FIG. 2.

In step S200, if the extension of an audio file selected as a recovery target by a user and stored in the file entry information in the second recording medium 111 is DAT, the recovery necessity determination unit 114 determines that the audio file is a recovery target. If the audio file is a recovery target (YES in step S200), the processing proceeds to step S201. If the extension of the audio file is not DAT, the recovery necessity determination unit 114 determines that the audio file is not a recover target (NO in step S200), and the processing ends without execution of recovery.

In step S201, the recovery necessity determination unit 114 determines whether the video file associated with the audio file as the recovery target is present based on the file entry information. Specifically, the recovery necessity determination unit 114 determines whether the video file recorded at the same time as the audio file is stored in the first recording medium 109. In some cases, a plurality of video files divided by file break may be associated with a single audio file. An audio file may be associated with a video file using a file name common to both of the files except the extensions, be associated with a video file related to metadata of the files, or be associated with a video file under the file name of the audio file or the file path recorded therein. Based on such information, the recovery necessity determination unit 114 determines the video file corresponding to the audio file. If the video file associated with the audio file (the recovery target) is present (YES in step S201), the processing proceeds to step S202. Otherwise (NO in step S201), the processing proceeds to step S205.

In step S202, the recovery necessity determination unit 114 determines the video file to be a recovery target if the extension of the video file associated with the audio file in the file entry information is DMV. If the video file is a recovery target (YES in step S202), the processing proceeds to step S203. If not (NO in step S202), the processing proceeds to step S204.

In step S203, the video file recovery unit 119 analyzes the corrupted video file determined to be a recovery target, and truncates the video data of the video file based on the valid data length detected (the length of recording completed data). Then, the video file recovery unit 119 updates the metadata based on the valid data length to recover the video file. The video file is recovered, and then the processing proceeds to step S204.

In step S204, the metadata acquisition unit 115 analyzes the header portion of the video file associated with the audio file as the recovery target to acquire the total number of frames, the recording frame rate, and the playback frame rate from the metadata. If the video file associated with the audio file as the recovery target has undergone the recovery processing in step S203, the audio file before the recovery is different in the total number of frames from the recovered audio file. In step S204, the metadata acquisition unit 115 therefore acquires the metadata after the recovery. Then, the processing proceeds to step S205.

In step S205, the file entry information acquisition unit 113 acquires the file size of the corrupted audio file as the recovery target from the file entry information. The metadata acquisition unit 115 analyzes the header portion of the audio file as the recovery target to acquire the header size, the number of audio samples, and the sample size from the metadata. Then, the processing proceeds to step S206.

In step S206, the end position calculation unit 116 calculates a padding or truncation size to be performed on the audio data of the audio file as the recovery target. If the presence of the video file associated with the recovery target audio file has been determined in step S201, the end position calculation unit 116 calculates a padding size to be performed on the audio file. The padding side allows lip synchronization to be achieved with a playback time scale adjusted so that the playback start position and the playback end position of the audio file coincide with those of the video file, both files of which are recorded at different speed rates by the slow and fast function. The padding size is calculated through the method above-mentioned. Thus, in step S206, the end position calculation unit 116 uses Expression 1 to calculate a padding size with the total number of frames of the video file, the recording frame rate, and the playback frame rate acquired in step S204, and the file size of the audio file before the recovery, the header size, the number of audio samples, and the sample size acquired in step S205. The padding size is a data size to be added to the audio data of the audio file. The padding size allows the audio data to have the same length of the end of its playback end as the end of the playback end of the video data in playback at the speed rate in time with the recording speed rate of the video data. On the other hand, if the absence of the video file associated with the recovery target audio file has been determined in step S201, the end position calculation unit 116 calculates a truncation size. The truncation size allows the recovered audio data to have the same size as the size of an audio sample multiplied by a multiple of the number of audio samples. Then, the processing proceeds to step S207.

In step S207, the end position adjustment unit 117 performs padding or truncation on the audio file end based on the padding size or the truncation size calculated in step S206.

Figure 3:
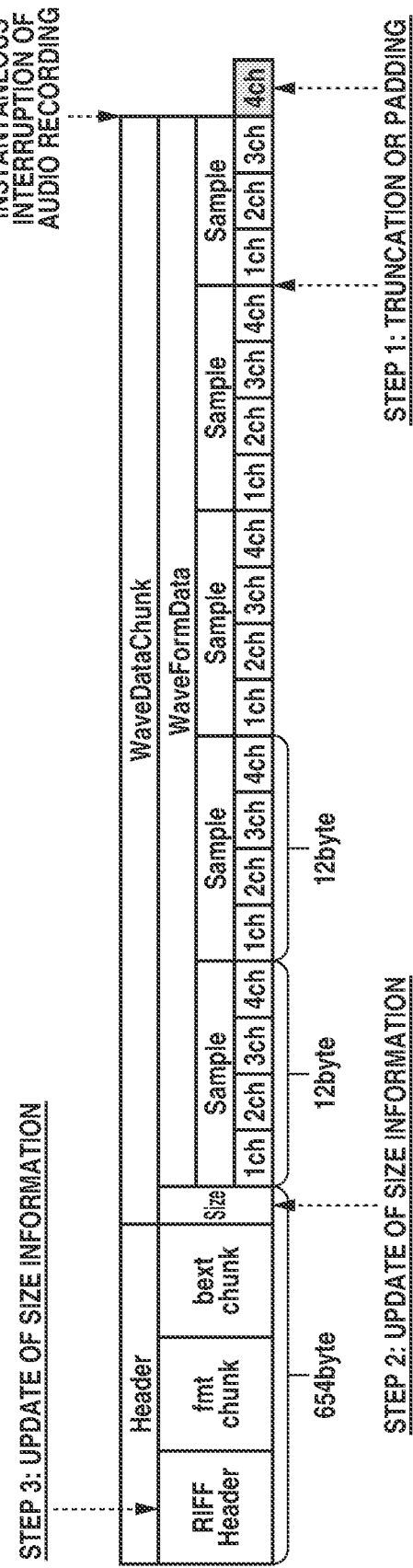
FIG. 3 is a schematic diagram illustrating an audio file structure.
Figure 4A:
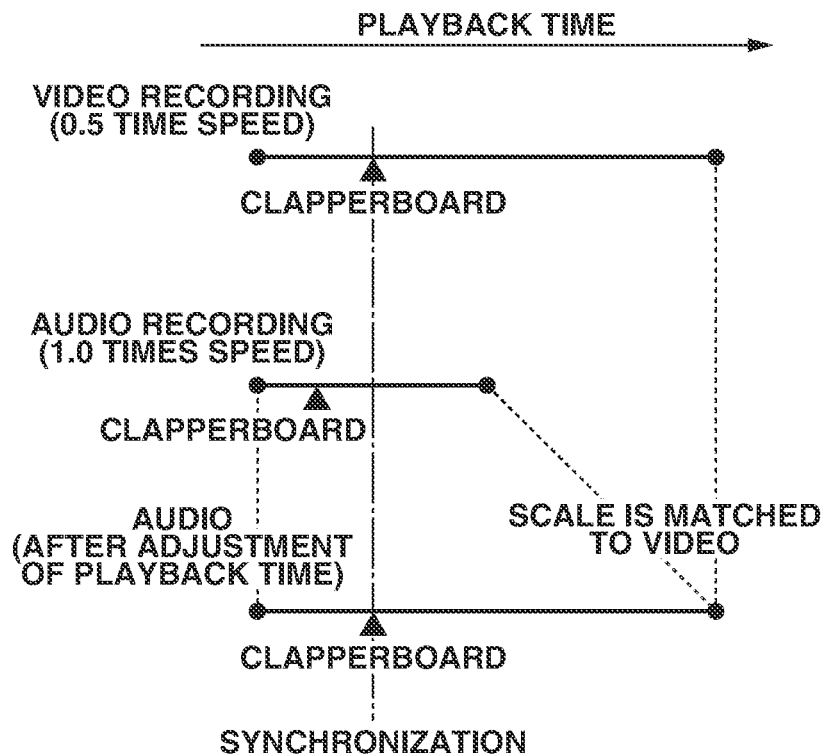
FIGS. 4A and 4B are schematic diagrams illustrating lip synchronization of audio with video recorded using a slow and fast function.
Figure 4B:
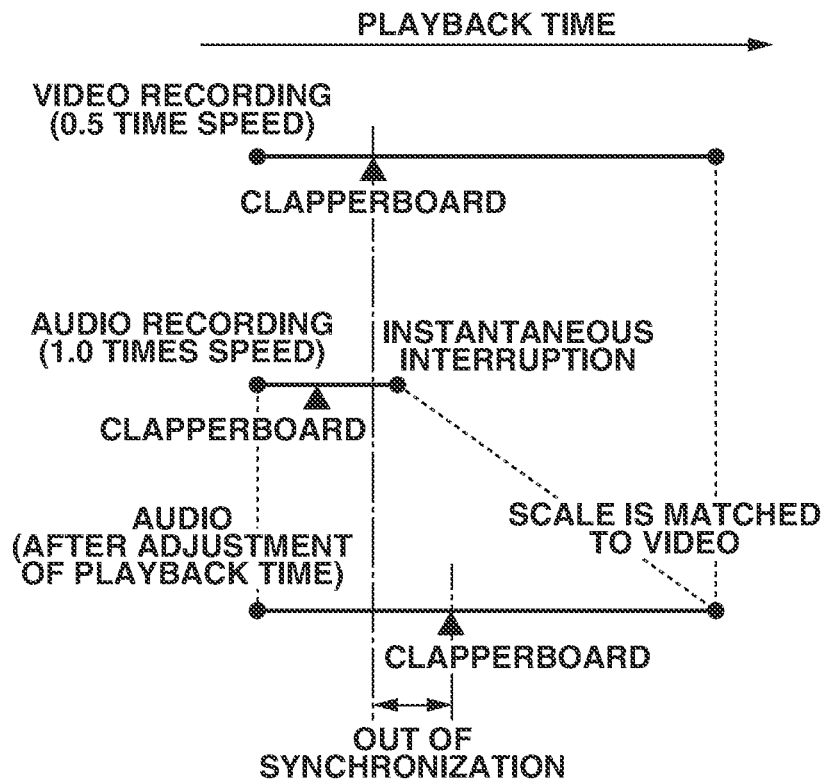

In step S208, the size information update unit 118 records the size information about the recovered audio data padded or truncated in step S207 in size information about Wave Form Data to update the data size (Step 2 in FIG. 3). Subsequently, the processing proceeds to step S209.

In step S209, the size information update unit 118 updates size information about RIFF Header based on the recovered audio file size information (Step 3 in FIG. 3). Then, the processing proceeds to step S210.

In step S210, the second recording medium control unit 112 changes the extension of the recovered audio file from DAT to WAV, and the audio file recovery processing ends.

The audio file recovery processing achieves the lip synchronization of the audio data and the video data through their synchronization even by scale adjustment processing for the playback start position and playback end position of the audio data of the recovered audio file to coincide with the playback start position and playback end position of the video data of the video file in recovery processing of an audio file recorded at a speed rate from the speed at which the corresponding video data is recorded, using a slow and fast function.

In the above exemplary embodiment, the audio processing apparatus 100 is described as an example. In some exemplary embodiments, the present disclosure is achieved with an image capturing apparatus including an image capturing unit, an image processing unit, a microphone, and an audio processing unit. The image capturing apparatus enables video data that is captured by the image capturing unit and then that is subjected to processing by the image processing unit and audio data that is picked up by the microphone and then that is subjected to processing by the audio processing unit to be recorded in a video file and in an audio file, respectively. The image capturing apparatus may have a slow and fast function of recording audio data in an audio file at a speed rate different from the speed at which corresponding video data in a video file is recorded.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-028053, filed Feb. 21, 2020, which is hereby incorporated by reference herein in its entirety.

What is claimed is:

1. An audio processing apparatus comprising:
one or more memories storing instructions; and
one or more processors executing the instructions to cause the audio processing apparatus to function as:
an operation control unit configured to issue operation information;
a control unit configured to receive the operation information and issue a recovery preparation instruction;
a file entry information acquisition unit configured to receive the recovery preparation instructions and acquire a video file entry information and an audio file entry information;
a recovery necessity determination unit configured to determine a video file to be recovered and an audio file to be recovered based on the video file entry information and the audio file entry information, the audio file to be recovered being related to the video file to be recovered;
a video file recovery unit configured to recover video data of the video file to be recovered;
an audio file recovery unit configured to recover audio data of the audio file to be recovered which is related to the video file to be recovered,
wherein, in a case with video data of the video file and audio data of the audio file are recorded at different speed rates from each other, the audio file recovery unit recovers the audio file so that an end position of the audio data coincides with an end position of the video data in playback of the audio data and the video data at a speed rate.

2. The audio processing apparatus according to claim 1, wherein, with video data of the video file and audio data of the audio file recorded at different speed rates from each other, the audio file recovery unit recovers the audio file so that adjustment of an end position of the audio data by padding or truncation performed on the audio data causes the end position of the audio data coincide with an end position of the video data in playback of the audio data and the video data at a speed rate.

3. The audio processing apparatus according to claim 2, wherein the audio file recovery unit calculates a size of pudding or truncation based on a speed rate of the video data with respect to the audio data and a total number of frames of the video file to adjust the end position of the audio data.

4. The audio processing apparatus according to claim 1, further comprising a video file recovery unit configured to recover video data,
wherein the audio file recovery unit recovers the audio file so that an end position of audio data of the audio file coincides with an end portion of video data of the video file related to the audio file and recovered by the video file recovery unit.

5. The audio processing apparatus according to claim 1, wherein audio data of the audio file is recorded at 1.0 times speed, and video data of the video file is recorded at a speed rate different from the audio data.

6. The audio processing apparatus according to claim 1, wherein the audio file and the video file are recorded in a detachable recording medium.

7. The audio processing apparatus according to claim 6, wherein the audio file and the video file are recorded in different detachable recording media from each other.

8. A method of controlling an audio processing apparatus to recover an audio file related to a video file, the method comprising:
- issuing operation information;
- receiving operation information and issue a recovery preparation instruction;
- receiving the recovery preparation instructions and acquire a video file entry information and an audio file entry information;
- determining a video file to be recovered and an audio file to be recovered based on the video file entry information and the audio file entry information, the audio file to be recovered being related to the video file to be recovered;
- recovering video data of the video file to be recovered; and
- recovering audio data of the audio file to be recovered which is related to the video file to be recovered,
- wherein, in a case with video data of the video file and audio data of the audio file are recorded at different speed rates from each other, the audio file is recovered so that an end position of the audio data coincides with an end position of the video data in playback of the audio data and the video data at a speed rate.

9. A non-transitory computer-readable storage medium storing a program for causing a computer to execute a method of controlling the audio processing apparatus to recover an audio file related to a video file, the method comprising:
- issuing operation information;
- receiving operation information and issue a recovery preparation instruction;
- receiving the recovery preparation instructions and acquire a video file entry information and an audio file entry information;
- determining a video file to be recovered and an audio file to be recovered based on the video file entry information and the audio file entry information, the audio file to be recovered being related to the video file to be recovered;
- recovering video data of the video file to be recovered; and
- recovering audio data of the audio file to be recovered which is related to the video file to be recovered,
- wherein, in a case with video data of the video file and audio data of the audio file are recorded at different speed rates from each other, the audio file is recovered so that an end position of the audio data coincides with an end position of the video data in playback of the audio data and the video data at a speed rate.

* * * * *